United States Patent
Wang et al.

(10) Patent No.: US 9,510,308 B2
(45) Date of Patent: Nov. 29, 2016

(54) LEX SIGNAL TRACKING METHOD, POSITIONING SIGNAL RECEIVING METHOD, LEX SIGNAL TRACKING PROGRAM, POSITIONING SIGNAL RECEIVING PROGRAM, LEX SIGNAL TRACKING DEVICE, POSITIONING SIGNAL RECEIVING DEVICE AND MOBILE TERMINAL

(75) Inventors: Dun Wang, Nishinomiya (JP); Masato Kawai, Nishinomiya (JP)

(73) Assignee: Furuno Electric Co. Ltd., Nishinomiya (JP)

( * ) Notice: Subject to any disclaimer, the term of this patent is extended or adjusted under 35 U.S.C. 154(b) by 585 days.

(21) Appl. No.: 13/982,236

(22) PCT Filed: Dec. 19, 2011

(86) PCT No.: PCT/JP2011/079295
§ 371 (c)(1),
(2), (4) Date: Aug. 5, 2013

(87) PCT Pub. No.: WO2012/101935
PCT Pub. Date: Aug. 2, 2012

(65) Prior Publication Data
US 2013/0308688 A1 Nov. 21, 2013

(30) Foreign Application Priority Data
Jan. 28, 2011 (JP) .................................. 2011-016840

(51) Int. Cl.
*G01S 19/30* (2010.01)
*H04W 56/00* (2009.01)

(52) U.S. Cl.
CPC ............ *H04W 56/003* (2013.01); *G01S 19/30* (2013.01)

(58) Field of Classification Search
CPC .............................. G01S 19/243; G01S 19/30
USPC ............ 342/357.4, 357.63, 357.69; 375/134, 375/211; 701/467, 468
See application file for complete search history.

(56) References Cited

U.S. PATENT DOCUMENTS

2009/0207075 A1    8/2009  Riley et al.

OTHER PUBLICATIONS

Japanese Patent Office, International Search Report of PCT/JP2011/079295, WIPO, Feb. 21, 2012, 1 page.
Wang Dun et al., "QZS-LEX Shingo Jushinki", GPS/GNSS Symposium 2010, Nov. 2010, pp. 175-182, 20 pages.
(Continued)

*Primary Examiner* — Dao Phan
(74) *Attorney, Agent, or Firm* — Alleman Hall McCoy Russell & Tuttle LLP

(57) ABSTRACT

A LEX signal tracking method of continuously tracking a LEX signal is provided. The LEX signal broadcast from a Quasi-Zenith Satellite is demodulated. A weekend approach notification signal $S_{near}$ is generated based on a time within a week obtained from the demodulated LEX signal. A state of a Long code, which is generated when a code correlation processing is performed, is analyzed. If the analyzed code state is in agreement with a stored 997425th code state, a pulse signal dplus is generated. If the generation of the pulse signal dplus is immediately after the detection of the weekend approach notification signal $S_{near}$, the Long code is reset to an initial state.

9 Claims, 6 Drawing Sheets

(56) References Cited

OTHER PUBLICATIONS

Geodetic Society of Japan: "GPS: Precision Positioning System by Satellites," revised edition, Japan Association of Surveyors, pp. 77-92, Nov. 2, 1991. 19 pages.

Takasu, T., "QZSS LEX Signal Overview, Evaluation and Extension," GPS/GNSS Symposium 2009, Session 2, No. 6, May 2009, 34 pages.

Intellectual Property Office of the People's Republic of China, Office Action and Search Report Issued in Application No. 201180065647.7, Oct. 29, 2014, 7 pages.

LEX SIGNAL TRACKING METHOD, POSITIONING SIGNAL RECEIVING METHOD, LEX SIGNAL TRACKING PROGRAM, POSITIONING SIGNAL RECEIVING PROGRAM, LEX SIGNAL TRACKING DEVICE, POSITIONING SIGNAL RECEIVING DEVICE AND MOBILE TERMINAL

TECHNICAL FIELD

The present invention relates to a method of continuously tracking a LEX signal used by a Quasi-Zenith Satellite System (QZSS).

BACKGROUND ART

The global positioning system form positioning signals by carrying out a code modulation of a carrier wave where a navigation message is superimposed. A positioning signal receiving device acquires the navigation message by receiving and demodulating the positioning signals; however, for this demodulation, the positioning signals must be acquired and tracked. Such acquisition and tracking of the positioning signals use the results of code correlation processing which is applied to codes obtained by the modulation of the carrier wave.

For example, as shown in Nonpatent Document 1, in the GPS (Global Positioning System), a code modulation of the L1 wave which is a carrier wave is carried out by the C/A code, and acquisition and tracking are performed based on a code correlation result of the C/A code.

REFERENCE DOCUMENTS OF CONVENTIONAL ART

Nonpatent Document

[Nonpatent Document 1]
Geodetic Society of Japan: "GPS: Precision Positioning System by Satellites," revised edition, Japan Association of Surveyors, pp. 77-92, Nov. 2, 1991.

DISCLOSURE OF THE INVENTION

Problem(s) to be Solved by the Invention

Meanwhile, in Japan, a Quasi-Zenith Satellite was launched in summer of 2010 for the purposes including an improvement in positioning accuracy. From this Quasi-Zenith Satellite, a positioning signal referred to as a LEX signal (QZSS LEX signal) is broadcast. A diffusion code constituting the LEX signal is comprised of a Short code and a Long code.

However, since in the Long code a timing at which one cycle of the code is ended differs from a timing at which the time is changed from a weekend to the beginning of another week (hereinafter, simply referred to as "the weekend timing"), a weekend reset in which the Long code of the LEX signal is initialized is performed at the weekend timing. For this reason, discontinuity is caused in a code phase of the Long code at the weekend timing.

Thus, unless the positioning signal receiving device which receives and tracks the LEX signal initializes a replica code so as to synchronize it with the timing at which the time is changed from a weekend to the beginning of another week, the code tracking is interrupted and the code tracking cannot be continuously performed.

The purpose of the present invention is to provide a LEX signal tracking method which continuously tracks a LEX signal.

SUMMARY OF THE INVENTION

The present invention relates to a LEX signal tracking method of tracking a LEX signal broadcast from a Quasi-Zenith Satellite. The LEX signal tracking method includes each of the following steps. The LEX signal tracking method includes a step adapted to detect that a weekend timing is approached less than a code cycle of a Long code of the LEX signal. The LEX signal tracking method includes a step adapted to acquire a timing of a chip corresponding to the weekend in the Long code. The LEX signal tracking method includes a step adapted to initialize the Long code at a timing when the detection of the approach of the weekend timing and the acquisition of the timing of the chip corresponding to the weekend are performed.

In this method, the timing of the chip corresponding to the weekend of the Long code can be acquired securely and accurately. Thus, the timing of changing from a weekend to the beginning of another week, i.e., the timing at which the Long code of the LEX signal is reset can be acquired accurately, and the Long code can be initialized accurately.

The step adapted to detect the approach of the weekend timing (approach detection step) in the LEX signal tracking method of the invention may include each of the following steps. The approach detection step may include a step adapted to demodulate a positioning signal containing the LEX signal to acquire a time within the week. The approach detection step may include a step adapted to observe the time within the week to detect that the time within the week is a time less than the code cycle from the weekend timing.

By this method, particular processing that detects an approach of the weekend timing is shown, and a case where the time within a week of the Quasi-Zenith Satellite System is used is shown. By using this method, the approach of the weekend timing can be detected only by common demodulation processing of the LEX signal.

The step adapted to acquire the timing of the chip corresponding to the weekend (weekend chip timing acquisition step) in the LEX signal tracking method of the invention may include the following steps. The weekend chip timing acquisition step may include a step adapted to analyze a state of the Long code. The weekend chip timing acquisition step may include a step adapted to detect that the state of the Long code is a state of the chip corresponding to the weekend. The weekend chip timing acquisition step may include a step adapted to acquire a timing of the state of the chip corresponding to the weekend.

By this method, particular processing that acquire the timing of the chip corresponding to the weekend is shown, and a case where the state of the demodulated Long code is analyzed is shown. Here, the term "state" shown in the present invention represents a sequence of continuous chip codes. Therefore, when using the state, specifically, for example, the sequence of the chip codes which appear at the weekend timing (state) is stored in advance, it is compared with the analyzed state, and when it is in agreement with the analyzed state, it is detected as the weekend timing By using this method, the timing of the chip of the weekend timing can be acquired only by the demodulation processing of the normal LEX signal.

Further, the step adapted to acquire the timing of the chip corresponding to the weekend (weekend chip timing acquisition step) in the LEX signal tracking method of the invention may include the following steps. The weekend chip timing acquisition step may include a step adapted to count a chip order of the Long code. The weekend chip timing acquisition step may include a step adapted to detect that the chip order is in an order of the chip of the weekend.

By this method, particular processing that acquire the timing of the chip corresponding to the weekend is shown, and a case where the chip number of the Long code is counted is shown. Also by this method, the timing of the chip corresponding to the weekend can easily be acquired.

Further, the timing of the chip corresponding to the weekend in the LEX signal tracking method of the invention may be a timing of the 997425th chip of the Long code. By this method, a particular example of the timing of the chip corresponding to the weekend is shown.

Effect of the Invention

According to the invention, although the time stretches over the timing of changing from a week to another where the Long code is discontinuous, the LEX signal can be tracked continuously.

MODE FOR CARRYING OUT THE INVENTION

A LEX signal tracking method (a LEX signal tracking device) and a positioning signal receiving method (a positioning signal receiving device) according to one embodiment of the present invention are described with reference to the drawings.

Figure 1:
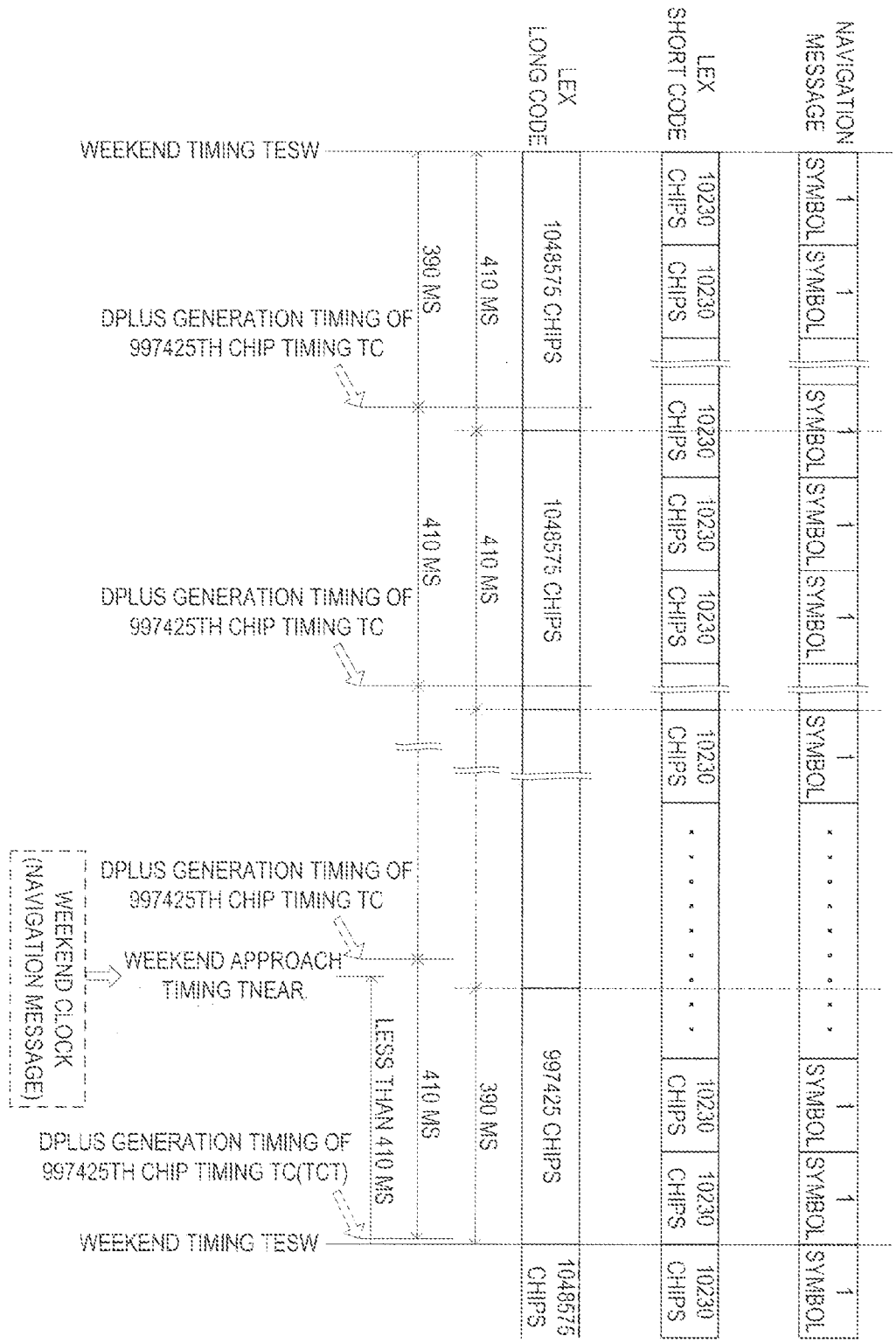
FIG. 1 is a time chart illustrating the concept of the weekend reset method of a Long code of a LEX signal according to one embodiment of the present invention.

First, the concept corresponding to a weekend reset of the LEX signal which is implemented in the invention is described. FIG. 1 is a time chart illustrating the concept of a weekend reset method of the Long code of the LEX signal according to the embodiment of the invention.

The LEX signal broadcast from a Quasi-Zenith Satellite is overlapped with a navigation message peculiar to the LEX signal, and is applied with a code modulation using the Short code and the Long code.

Here, as shown in FIG. 1, a cycle of 1 Symbol of the navigation message, as well as a code cycle of the Short code, are 4 milliseconds (10230 Chips). A timing of changing from a weekend to the beginning of another week, i.e., a timing at which it becomes 00:00:00 a.m. on Sunday (hereinafter, this timing is referred to as "the weekend timing $T_{ESW(End\text{-}Start\text{-}of\ Week)}$") is in agreement with a timing at which one cycle of the Short code ends. Therefore, in the Short code, discontinuity of the code is not generated at the weekend timing.

The code cycle of the Long code is 410 milliseconds (1048575 Chips). The weekend timing $T_{ESW}$ is not in agreement with the timing at which one cycle of the Long code ends, and the timing of 390 milliseconds (997425 Chips) from an initial state of the Long code is in agreement with the weekend timing $T_{ESW}$.

Therefore, the discontinuity of the code is generated in the Long code at the weekend timing $T_{ESW}$. For this reason, it is necessary for the positioning signal receiving device which receives the LEX signal to initialize a replica code of the Long code so as to synchronize it with the weekend timing $T_{ESW}$.

On the other hand, by the method and the configuration of the present application, the weekend timing $T_{ESW}$ is detected using the following concept.

As shown in FIG. 1, a chip corresponding to the weekend timing $T_{ESW}$ is the 997425th chip from the initial state.

Therefore, the Long codes generated in the code tracking of the LEX signal are sequentially acquired and observed to detect the 997425th chip. For example, observation of the state of the Long code or the count of chip order is used for the detection of chips.

Here, the state represents a sequence of continuous chip codes and, for example, it represents a sequence of a predetermined number of past chip codes containing the latest-acquired chip code. Therefore, particularly, when detecting the 997425th chip by the state observation, a sequence (state) of the chip codes having the 997425th chip that appears at the weekend timing as the latest chip is stored in advance, and it is then compared with an observed state. Then, the 997425th chip is detected by detecting that the stored state is in agreement with the observed state.

Note that, when counting the chip number, the counter may be reset to a counter value of 1 at the timing when it reaches the weekend timing and it is reset to the initial state. The counter value may be added each time the code chip is updated, and at a timing when the counter value becomes 997425, the 997425th chip may be detected.

Since the Long code is a cycle of 410 milliseconds (1048575 Chips) as described above, as shown in FIG. 1, a 997425th chip is repeatedly detected at the 410-millisecond cycle using a timing of 390 milliseconds from the timing at which the week changes as an initial timing (see every 997425th chip timing tc in FIG. 1).

In order to extract the 997425th chip corresponding to a weekend timing $T_{ESW}$ from the 997425th chips, a weekend approach timing $T_{near}$ is acquired during a period which is less than the code cycle (410 milliseconds) of the Long code back from the weekend timing $T_{ESW}$.

This acquisition of the weekend approach timing $T_{near}$ uses, for example, a demodulated time within a week contained in the navigation message of the LEX signal. Specifically, the navigation message which is demodulated by the tracking processing of the LEX signal concerned is analyzed, and the time within a week contained in the navigation message is sequentially observed. Then, a timing at which the time within a week indicative of the predetermined time which is less than 410 milliseconds back from the weekend timing $T_{ESW}$ was acquired is acquired as the weekend approach timing $T_{near}$.

Note that it may be counted using 1PPS signals, and, for example, using a weekend timing as a reference timing, the time count may be conducted synchronizing with the 1PPS signals, and a timing at which the predetermined time less than 410 milliseconds back from the weekend timing $T_{ESW}$ was counted may be considered as the weekend approach timing $T_{near}$.

By setting the weekend approach timing $T_{near}$ at such a timing, as shown in FIG. 1, an interval from the weekend approach timing $T_{near}$ to the weekend timing $T_{ESW}$ is less than 410 milliseconds. Meanwhile, the timing tc of the 997425th chip is at the 410-millisecond interval, and the timing tc (tcT) of the 997425th chip corresponding to the weekend timing $T_{ESW}$ is substantially in agreement with the weekend timing $T_{ESW}$. Therefore, a timing tc of the 997425th chip immediately before the timing tc (tcT) of the 997425th chip corresponding to the weekend timing $T_{ESW}$ does not fall within the time range from the weekend approach timing $T_{near}$ to the weekend timing $T_{ESW}$.

That is, only the timing tc (tcT) of the 997425th chip corresponding to the weekend timing $T_{ESW}$ falls within the time range from the weekend approach timing $T_{near}$ to the weekend timing $T_{ESW}$.

Then, the weekend timing $T_{ESW}$ is detected using a timing tc (tcT) of the 997425th chip which is detected first after the acquisition timing of the weekend approach timing $T_{near}$ as a trigger to initialize the Long code. Since the timing tc (tcT) of the 997425th chip detected after the acquisition timing of the weekend approach timing $T_{near}$ has synchronized with the weekend timing $T_{ESW}$, the weekend timing $T_{ESW}$ can be detected accurately.

Thus, the Long code can be initialized and reset synchronizing with the weekend timing $T_{ESW}$, and the code tracking can be continuously performed even if the observation stretches from one week to another.

Figure 2:
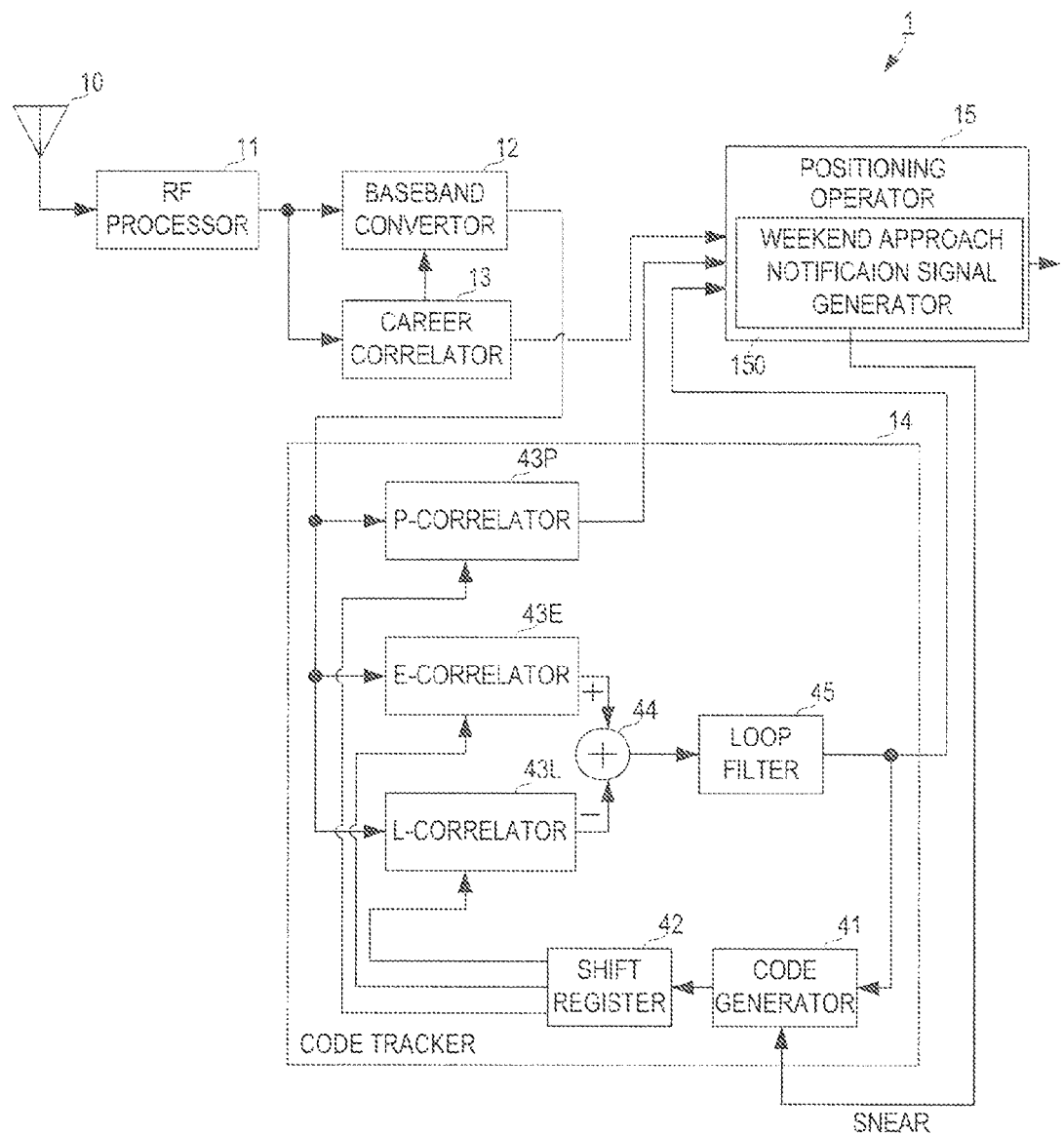
FIG. 2 is a block diagram showing a substantial configuration of a positioning signal receiving device 1 according to the embodiment of the invention.
Figure 3:
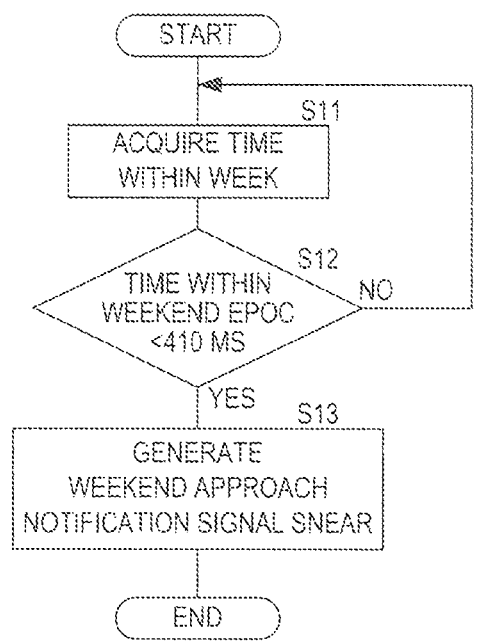
FIG. 3 is a flowchart in which a weekend approaching notification signal is generated according to the embodiment of the invention.
Figure 4:
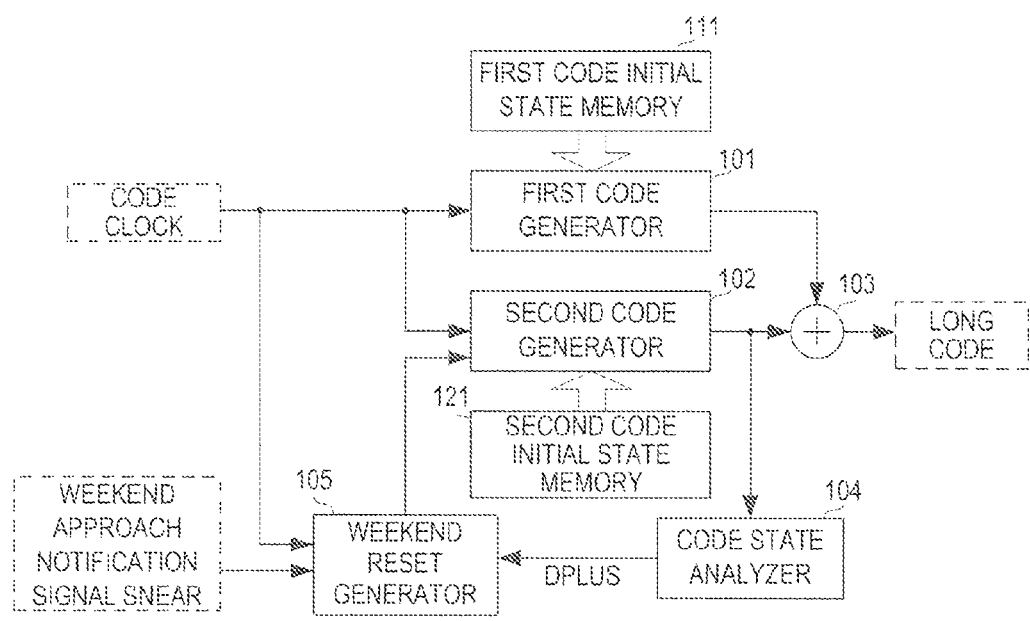
FIG. 4 is a block diagram showing a particular functional configuration of a code generator 41 according to the embodiment of the invention.
Figure 5:
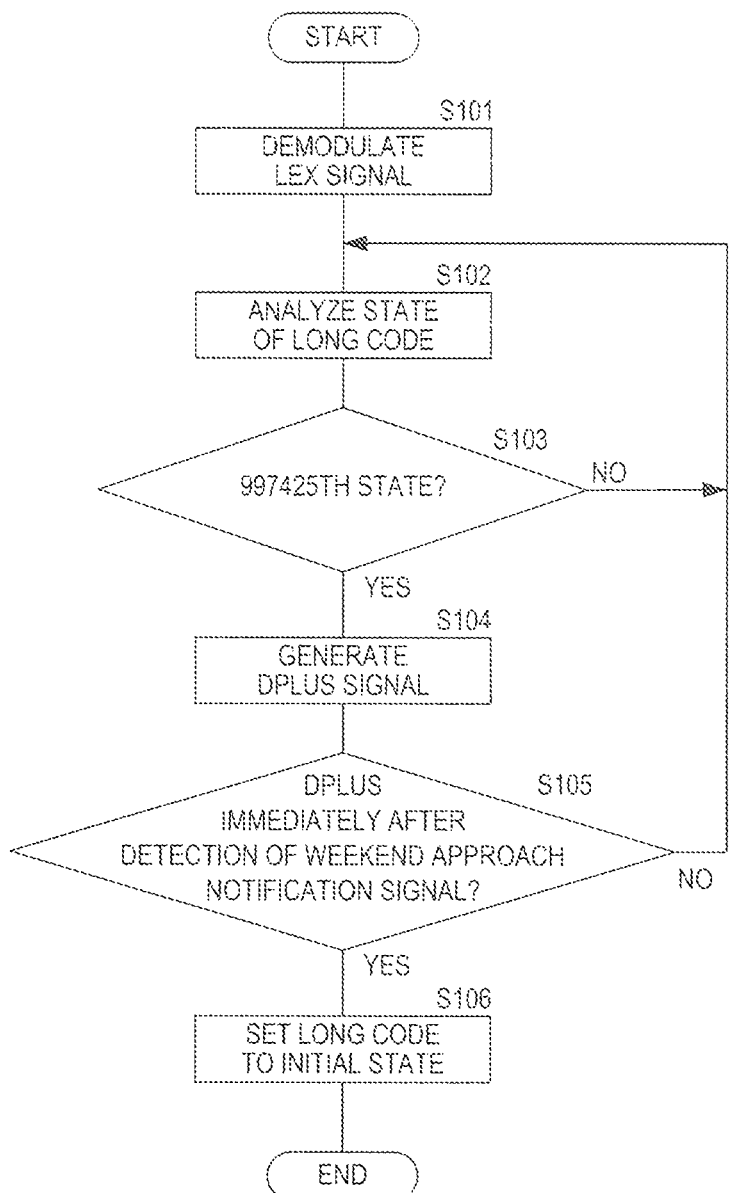
FIG. 5 is a flowchart of weekend reset processing according to the embodiment of the invention.

Next, a tracking device of the LEX signal and a positioning signal receiving device including the initialization at the weekend timing $T_{ESW}$ of the Long code are particularly described. FIG. 2 is a block diagram showing a substantial configuration of a positioning signal receiving device 1 of this embodiment. FIG. 3 is a flowchart in which the weekend approach notification signal Swres according to this embodiment is generated. FIG. 4 is a block diagram showing a particular functional configuration of a code generator 41 of this embodiment. FIG. 5 is a flowchart of weekend reset processing according to this embodiment.

Although, in the positioning signal receiving device 1 shown in FIG. 2, only functional parts related to the code tracking processing to the LEX signal are described, it also includes functional part which acquires and tracks positioning signals from other GNSSs (Global Navigation Satellite Systems). Note that, for example, if the number of Quasi-Zenith Satellites which broadcasts the LEX signals is more than four, it may be configured to perform only the acquisition and the tracking of the LEX signal.

The positioning signal receiving device 1 includes an RF processor 11, a baseband converter 12, a career correlator 13, a code tracker 14, and a positioning operator 15. In such a configuration, the configuration in which the code tracker 14 is combined with a weekend reset request signal generator 150 in the positioning operator 15 corresponds to "the LEX signal tracking device" of the present invention.

An antenna 10 is connected with an RF processor 11. The antenna 10 receives the LEX signal broadcast from the Quasi-Zenith Satellite and outputs the received signal to the RF processor 11. The RF processor 11 downconverts the received LEX signal to generate an intermediate frequency signal (IF signal), and outputs it to the baseband converter 12 and the career correlator 13.

The career correlator 13 calculates a carrier phase difference by multiplying the IF signal of the LEX signal by the carrier frequency signal. The carrier phase difference which is outputted is fed back to a career NCO via a loop filter of a predetermined time constant. The career NCO generates the carrier frequency signal based on the fed-back carrier phase. Note that the detected carrier phase difference is outputted also to the positioning operator 16.

The baseband converter 12 multiplies the IF signal of the LEX signal by the carrier frequency signal to generate a baseband signal. The baseband signal is outputted to the code tracker 14.

The code tracker 14 performs tracking processing of the baseband signal of the LEX signal. Although the details of the code tracker 14 will be described later, the code tracker 14 outputs a Prompt correlation value by a P-correlator 11, and outputs an integrated value of the E-L correlation values by the loop filter 45 to the positioning operator 15.

The positioning operator 15 decodes a navigation message from the Prompt correlation value. The positioning operator 15 calculates a pseudorange base on the integrated value of the E-L correlation values. The positioning operator 15 performs a positioning calculation by a known method using the navigation message and the pseudorange. In this case, the positioning operator 15 may also perform a more precise positioning calculation by using a carrier phase.

The weekend approach notification signal generator 150 of the positioning operator 15 acquires the time within a week from the navigation message, and generates a weekend approach notification signal $S_{near}$. FIG. 3 is a flowchart in which the weekend approach notification signal $S_{near}$ is generated according to this embodiment.

The weekend approach notification signal generator 150 sequentially acquires the time within a week (S11). The weekend approach notification signal generator 150 observes the time within a week continuously until it detects, using a time within a week, the given timing set in advance within a time range less than 410 milliseconds up to the weekend timing $T_{ESW}$ (S12: No→S11). When the predetermined timing is detected (S12: Yes), the weekend approach notification signal generator 150 generates and outputs the weekend approach notification signal $S_{near}$ at this timing (S13).

Specifically, for example, the weekend approach notification signal generator 150 generates and outputs the weekend approach notification signal $S_{near}$ at the timing when the time within a week which is before 400 milliseconds from the weekend timing $T_{ESW}$ is detected. Note that this timing is one example, and may be any other timing less than 410 milliseconds, for example, 300 milliseconds or 100 milliseconds; however, if it is longer than a time length of one chip of the Long code, the timing of the 997425th chip corresponding to the weekend timing $T_{ESW}$ can certainly be detected.

The generation timing of the weekend approach notification signal $S_{near}$ becomes the weekend approach timing $T_{near}$. The outputted weekend approach notification signal $S_{near}$ is given to the code generator 41 of the code tracker 14.

Next, a particular configuration and particular processing of the code tracker 14, which performs the code tracking while performing weekend reset processing of the Long code using the weekend approach notification signal $S_{near}$, are described.

As shown in FIG. 2, the code tracker 14 includes a code generator 41, a shift register 42, a P-correlator 43P, an E-correlator 43E, an L-correlator 43L, an adder/subtractor 44, and a loop filter 45.

The baseband signal of the LEX signal outputted from the baseband converter 12 is inputted into the P-correlator 43P, the E-correlator 43E, and the L-correlator 43L.

The P-correlator 43P multiplies the Prompt replica code signal by the baseband signal, and outputs the Prompt correlation value. The Prompt correlation value is inputted into the positioning operator 15.

The E-correlator 43E multiplies an Early replica code signal, which advances ½ chips in its code phase with respect to the Prompt replica code signal, by the baseband signal, and outputs an Early correlation value. The L-correlator 43L multiplies a Late replica code signal, which retards ½ chips in its code phase with respect to the Prompt replica code signal, by the baseband signal, and outputs a Late correlation value. Note that, in this embodiment, although each phase difference of the Early, Prompt, and Late is ½ chips, the phase difference (so-called spacing) may be suitably set according to situations. Further, in this embodiment, although it is described so that the correlation processing of the respective replica code signals and the baseband signal are simply carried out, the correlation processing with the baseband signal are actually carried out using an I-phase replica code signal and a Q-phase replica code signal to calculate the correlation values, respectively.

The adder/subtractor 44 generates an E-L correlation value by subtracting the Late correlation value from the Early correlation value. The E-L correlation value is fed back to the code generator 41 via the loop filter 45, and is outputted to the positioning operator 15 as well.

Although a particular generation method will be described later, the code generator 41 generates the replica code signal of the LEX signal based on the E-L correlation value, and outputs it to the shift register 42.

The shift register 42 generates the Early replica code signal, the Prompt replica code signal, and the Late replica code signal, which differ mutually in their code phases by ½ chips, based on the replica code signal from the code generator 41. The Prompt replica code signal is synchronously outputted to the P-correlator 43P, the Early replica code signal to the E-correlator 43E, the Late replica code signal to the L-correlator 43L.

The code tracking processing is performed by the configuration and processing of the feedback loop described above.

In such a configuration, the code generator 41 is comprised of the structure shown in FIG. 4, and it generates the replica code signal while performing the weekend resetting shown in FIG. 5. In FIG. 4, only the generator of the Long code is shown and illustration of the generator of the Short code is omitted. As shown in FIG. 4, the code generator 41 includes a first code generator 101, a second code generator 102, an adder 103, a code state analyzer 104 corresponding to a "pulse signal generator for a weekend timing" of the present invention, a weekend reset signal generator 105, a first code initial state memory 111, and a second code initial state memory 121.

The first code generator 101 is a 10-stage linear feedback shift register, and is comprised of a configuration achieving a polynomial $G(X)=X10+X9+X6+X5+X4+X3+1$. A code clock (Code Clock) is inputted into the first code generator 101, and the first code is generated synchronizing with the code clock. The generated first code is outputted to the adder 103.

The first code initial state memory 111 stores an initial state of the first code generator 101. The first code initial state memory 111 gives the stored initial state to the first code generator 101 when the generation of the Long code is started.

The second code generator 102 is a 20-stage linear feedback shift register, and is comprised of a configuration achieving a polynomial $G(X)=X20+X19+X16+X14+1$. The Code clock (Code Clock) is inputted into the second code generator 102, and the second code is generated synchronizing with the code clock. The generated second code is outputted to the adder 103 and the code state analyzer 104.

When the generation of the Long code is started or when the reset signal is inputted from the weekend reset signal generator 105, the second code generator 102 opens a gate to the second code initial state memory 121, and it is reset to the initial state stored in the second code initial state memory 121.

The second code initial state memory 121 stores the initial state of the second code generator 102.

The adder 103 adds the first code to the second code to generate and output the Long code.

The code state analyzer 104 sequentially stores the chip of the second code, and sequentially analyzes the state which is a sequence of the predetermined number (for example, the number of stages of the second code generator 102) of the latest chip codes in the second code. The code state analyzer 104 stores the code state of the 997425th chip in advance. The code state analyzer 104 compares the analyzed code state with the code state of the 997425th chip stored in advance, and at a timing when these code states are in agreement with each other, the code state analyzer 104 generates a pulse signal dplus and outputs it to the weekend reset signal generator 105.

The pulse signal dplus from the code state analyzer 104 and the weekend approach notification signal $S_{near}$ from the weekend approach notification signal generator 150 is inputted into the weekend reset signal generator 105.

The weekend reset signal generator 105 generates the weekend reset signal at an input timing of the pulse signal dplus immediately after the weekend approach notification signal $S_{near}$ is inputted, and outputs it to the second code generator 102.

By such a configuration, S102 to S106 of the process flow shown in FIG. 5 is implemented. Note that, below, the process flow will be described including S101 which is a requisite for S102.

First, the LEX signal broadcast from the Quasi-Zenith Satellite is received, and the acquisition and the tracking of the LEX signal are performed by the code correlation processing. The LEX signal is demodulated when the tracking of the LEX signal is started (S101). The weekend approach notification signal $S_{near}$ is generated based on the time within a week acquired in the demodulation of the LEX signal.

The state is analyzed by sequentially acquiring the state of the Long code generated in the code correlation processing described above (S102). The code state of the 997425th chip is stored in advance, and if the analyzed code state is not in agreement with the stored code state (S103: No), the state analysis of the Long code is continued (S102).

If the analyzed code state is in agreement with the stored code state (S103: Yes), the pulse signal dplus is generated (S104).

Here, if the generation of the pulse signal dplus is not immediately after the detection of the weekend approach notification signal $S_{near}$ (S105: No), the state analysis of the Long code is continued (S102).

If the generation of the pulse signal dplus is immediately after the detection of the weekend approach notification signal $S_{near}$ (S105: Yes), the Long code is reset to the initial state (S106).

As described above, the Long code can be initialized (reset) accurately at the weekend timing $T_{ESW}$ by using the configuration and processing of this embodiment, without using the weekend reset request signal contained in the LEX signal. Thus, the code tracking of the LEX signal can be continued even if the tracking crosses over a weekend timing $T_{ESW}$.

Note that in the above-described embodiment, although each functional part is described as a block, these functional parts may be implemented as individual hardware such as individual elements or circuits, or may be implemented by an arithmetic processor such as a CPU executing a program which is stored as the processing described above.

Further, in the above, although the timing of the chip of a weekend or the timing tc (tcT) of the 997425th chip is simply described, this timing may be a start timing of the chip concerned or may be an end timing. However, as the start timing, if the time length of the pulse of the pulse signal dplus is made substantially identical to the time length of the chip, the reset processing of the Long code will be possible where it is more accurately synchronized with the weekend timing $T_{ESW}$. Thus, the accuracy of the tracking can be further improved even if it stretches from one week to another.

Further, in the above description, although the example where the weekend approach notification signal $S_{near}$ is generated using the time within a week contained in the navigation message of the LEX signal, other times within a week of other GNSS systems may be used, such as a time within a week contained in the L1C/A signal of the GPS, for example. In this case, if time correction information for other GNSS systems contained in the navigation message of the LEX signal is used, the generation timing of the weekend approach notification signal $S_{near}$ can be obtained more accurately. Further, the time information may be acquired from a device which uses time synchronized with a Quasi-Zenith Satellite System different from that of the positioning signal receiving device (for example, wireless communications from a terrestrial base station), and it may be used for the generation timing of the weekend approach notification signal $S_{near}$.

Further, in the above description, although the code state of the 997425th chip is detected from the code state of the second code which constitutes the Long code, the code state of the 997425th chip may be detected using the Long code outputted eventually.

Further, in the above description, although the predetermined timing set in advance within the time range of less than 410 milliseconds back from the weekend timing $T_{ESW}$ is detected based on the time within a week, earlier timing may be detected, and an output of the weekend approach notification signal $S_{near}$ may be delayed up to a timing within the range of 410 milliseconds.

Further, if other time events generated at the timing of the 997425th chip exist, the time events may be detected and the pulse signals dplus may be generated.

Further, in the above, although the configuration and processing for a Japan's Quasi-Zenith Satellite System are shown, the configuration and processing may also be applied to a system which has code specifications where discontinuity of the code may be produced en route and, thus, similar sequential code tracking may be possible.

Further, in the above, although the example where the weekend approach notification signal generator 150 is provided inside the positioning operator 15, the weekend approach notification signal generator 150 may be provided functionally separately from the positioning operator 15, and it may be provided inside a functional block constituting the code tracker 14.

Figure 6:
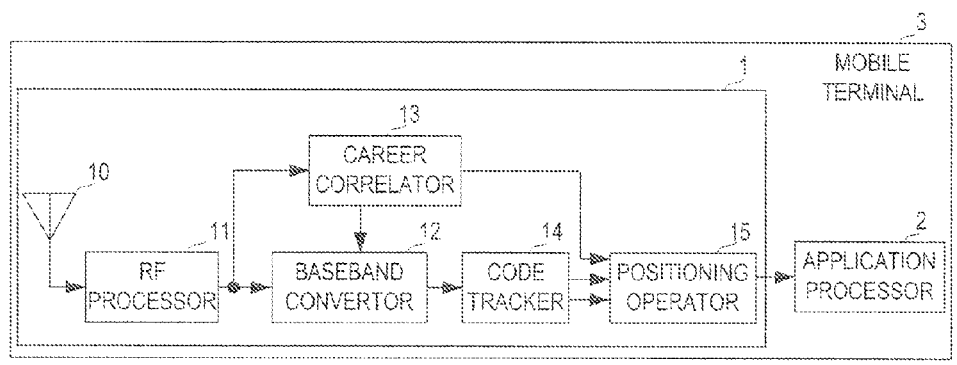
FIG. 6 is a block diagram showing a substantial configuration of a mobile terminal 3 including the positioning signal receiving device 1 of the present invention.

Further, the positioning signal receiving device 1 is also used for a mobile terminal 3 or the like as shown in FIG. 6. FIG. 6 is a block diagram showing a substantial configuration of the mobile terminal 3 including the positioning signal receiving device 1 of the present invention.

The mobile terminal 3 as shown in FIG. 6 is, for example, a mobile phone, a car navigation device, a PND, a camera or a clock, and includes an application processor 2 as well as the positioning signal receiving device 1.

The application processor 2 executes processing such as displaying the location of the device itself or using the location for navigation based on the positioning results obtained from the positioning operator 15 of the positioning signal receiving device 1.

In such a configuration, by having a configuration in which the code tracking processing can be continued by using the LEX signal even if the processing crosses over a weekend, the pseudo range can be continuously calculated with high precision. By this, for example, highly-precise location indications and navigation can be continuously achieved without being affected by time.

DESCRIPTION OF REFERENCE NUMERALS

1: Positioning Signal Receiving Device; 2: Application Processor; 3: Mobile Terminal; 10: Antenna; 11: RF Processor; 12: Baseband Converter; 13: Career Correlator; 14: Code Tracker; 15: Positioning Operator; 41: Code Generator; 42: Shift Register; 43P: P-Correlator; 43E: E-Correlator; 43L: L-Correlator; 44: Adder/Subtractor; 45: Loop Filter; 101: First Code Generator; 102: Second Code Generator; 103: Adder; 104: Code State Analyzer; 105: Weekend Reset Signal Generator; 111: First Code Initial State Memory; 121: Second Code Initial State Memory; and 150: Weekend Approach Notification Signal Generator.

The invention claimed is:

1. A LEX signal tracking method of tracking a LEX signal broadcast from a Quasi-Zenith Satellite, comprising:
   detecting that a weekend timing is approached less than a code cycle of a Long code of the LEX signal;
   acquiring a timing of a chip corresponding to the weekend in the Long code; and
   initializing the Long code at a timing when the detection of the approach of the weekend timing and the acquisition of the timing of the chip corresponding to the weekend are performed.

2. The LEX signal tracking method of claim 1, wherein the detecting of the approach of the weekend timing includes:
   demodulating a positioning signal containing the LEX signal to acquire a time within the week; and
   observing the time within the week to detect that the time within the week is a time less than the code cycle from the weekend timing.

3. The LEX signal tracking method of claim 1, wherein the acquiring the timing of the chip corresponding to the weekend includes:
   analyzing a state of the Long code;
   detecting that the state of the Long code is a state of the chip corresponding to the weekend; and acquiring a timing of the state of the chip corresponding to the weekend.

4. The LEX signal tracking method of claim 1, wherein acquiring the timing of the chip corresponding to the weekend includes:
   counting a chip order of the Long code; and
   detecting that the chip order is in an order of the chip of the weekend.

5. The LEX signal tracking method of claim 1, wherein the timing of the chip corresponding to the weekend is a timing of the 997425th chip of the Long code.

6. A positioning signal receiving method, comprising:
   each steps of the LEX signal tracking method of claim 1; and
   performing a positioning calculation using a correlation result between a replica code signal containing the generated Long code and the LEX signal.

7. A LEX signal tracking device for tracking a LEX signal broadcast from a Quasi-Zenith Satellite, comprising:
   a weekend approach notification signal generator for detecting that a weekend timing is approached less than a code cycle of a Long code of the LEX signal to generate a weekend approach notification signal;
   a pulse signal generator for the weekend timing for detecting a timing of a chip corresponding to the weekend in the Long code to generate a pulse signal; and
   a weekend reset signal generator for generating a weekend reset signal to initialize the Long code at a timing when the detection of the approach of the weekend timing and the acquisition of the timing of the chip corresponding to the weekend are performed.

8. A positioning signal receiving device, comprising:
   each component of the LEX signal tracking device of claim 7; and
   a positioning operator for performing a positioning calculation using a correlation result between a replica code signal containing the generated Long code and the LEX signal.

9. A mobile terminal, comprising:
   the positioning signal receiving device of claim 8; and
   an application processor for executing a predetermined application using a positioning calculation result of the positioning operator.

* * * * *